(12) United States Patent
Wilk

(10) Patent No.: US 6,182,557 B1
(45) Date of Patent: Feb. 6, 2001

(54) AUXILIARY COOKING SURFACES

(76) Inventor: Peter J. Wilk, 185 W. End Ave., New York, NY (US) 10023

( * ) Notice: Under 35 U.S.C. 154(b), the term of this patent shall be extended for 0 days.

(21) Appl. No.: 09/426,820

(22) Filed: Oct. 22, 1999

(51) Int. Cl.[7] .................................................. A47J 37/10
(52) U.S. Cl. ................... 99/339; 99/422; 99/448; 426/523
(58) Field of Search .............. 99/422, 448, 339, 99/340, 413, 425; 220/573.1, 4.03, 700; 426/523, 520

(56) References Cited

U.S. PATENT DOCUMENTS

| | | | |
|---|---|---|---|
| 2,493,222 | * 1/1950 | Braucht | 99/339 |
| 2,897,744 | * 8/1959 | Crowley | 99/339 |
| 4,462,388 | 7/1984 | Bohl et al. | 126/390 |
| 4,574,777 | 3/1986 | Bohl et al. | 126/390 |
| 4,691,690 | 9/1987 | Jensen | 126/390 |
| 4,987,827 | 1/1991 | Marquez | 99/331 |
| 5,048,688 | 9/1991 | Hicks, Jr. | 206/501 |
| 5,323,693 | 6/1994 | Collard et al. | 126/390 |
| 5,678,531 | * 10/1997 | Byers et al. | 99/422 X |
| 5,913,966 | * 6/1999 | Arnone et al. | 99/413 |

* cited by examiner

Primary Examiner—Reginald L. Alexander
(74) Attorney, Agent, or Firm—R. Neil Sudol; Henry D. Coleman; William J. Sapone

(57) ABSTRACT

An insert for a frying pan is designed to provide a warming or holding function to an existing cooking function for a conventional frying pan. An insert consists of a segment of material of an appropriate thermal conductance shaped to fit against an edge or lip of a conventional pan of a given diameter. The segment is covered with a non-stick surface to protect an existing pan cooking surface and provide the usual benefits of non-stick food preparation surfaces. The insert is provided with a combined handle and clip for attachment to a side wall of an existing pan, and easy removal of a heated insert covered with prepared foodstuff.

11 Claims, 3 Drawing Sheets

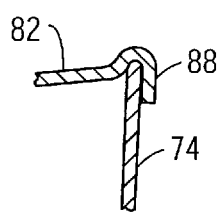
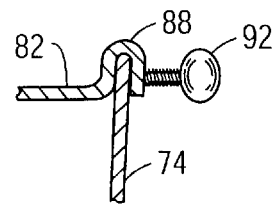
FIG. 3  FIG. 4
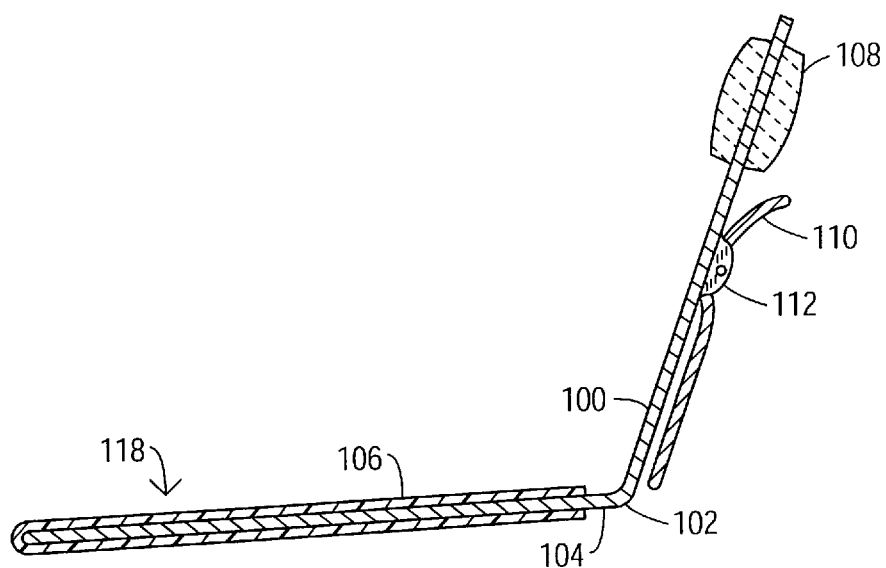
FIG. 5
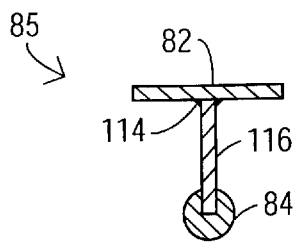
FIG. 6

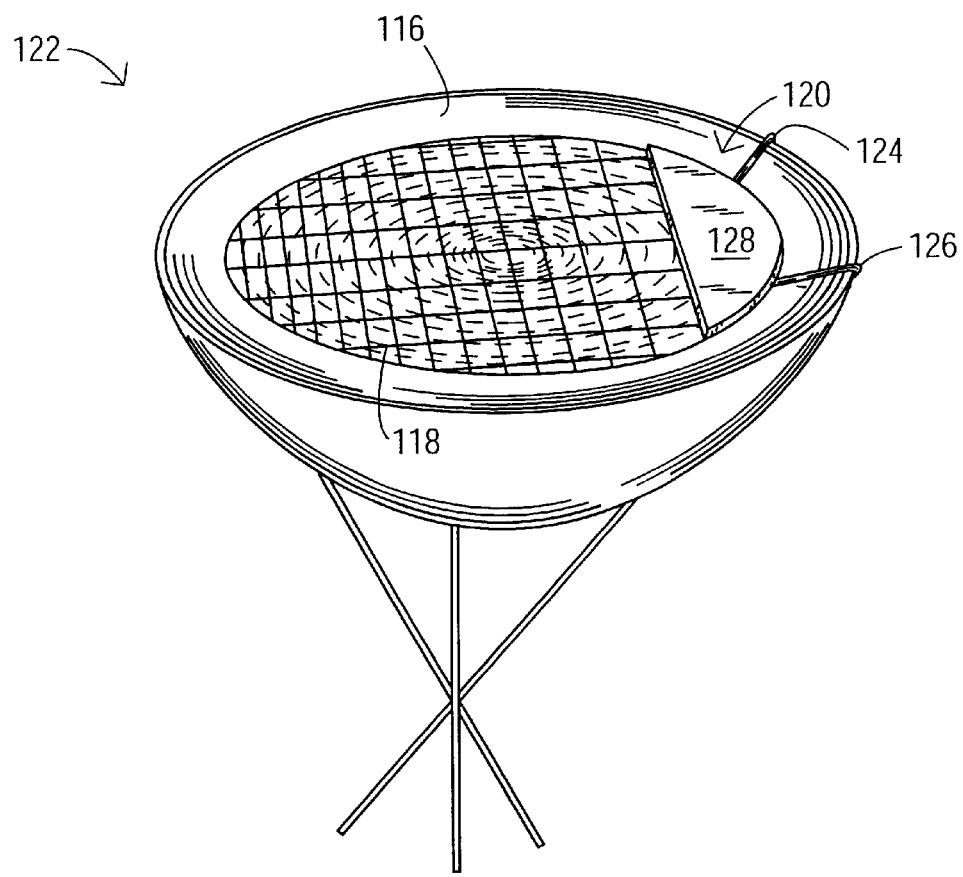
FIG. 7
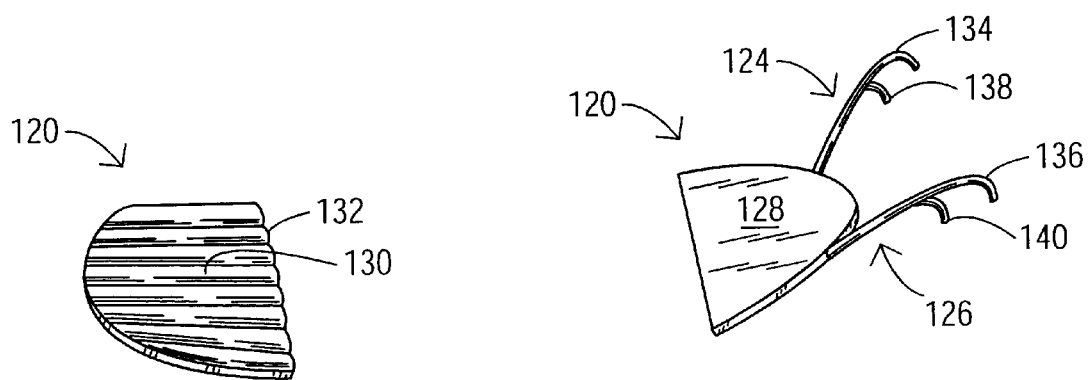
FIG. 8
FIG. 9

AUXILIARY COOKING SURFACES

BACKGROUND OF THE INVENTION

This invention relates to cooking. More particularly, this invention relates to a device for facilitating the preparation of cooked food items. This invention also relates to an associated method used in cooking.

Anyone who has made a serious attempt at quality cooking knows the inconvenience of preparing small quantities of multiple ingredients requiring different preparation times. Heating ingredients together in a mélange usually results in a less appealing final product than cooking the ingredients separately and combining individually prepared moieties just prior to final presentation, or at another optimum time. Separate preparation of ingredients, however, poses a problem of maintaining already prepared portions in a state of "hot standby" while waiting for further preparation steps, or else involves the nuisance of using separate pans or utensils for small quantities of ingredients. Accordingly, there is a need for a pan or utensil which will independently permit optimum preparation and standby storage of a variety of small ingredient portions.

It is known to provide a cooking surface with multiple cooking temperatures. For example, U.S. Pat. No. 4,987,827 to Marquez discloses an apparatus for cooking foodstuffs, particularly tortillas, which has a first heating area for cooking a tortilla, and a second heating area for warming a tortilla during a subsequent filling operation. Distinct electric heating elements are provided with separate thermostatic controls under a common cooking surface. U.S. Pat. No. 4,462,388 to Bohl and U.S. Pat. No. 4,574,777 to Hiller disclose a series of frying pans with a cooking surface and one or more "depositing" surfaces, for the warming of food. The depositing surfaces are elevated with respect to the cooking surface and designed not to be in direct contact with a burner element or heat source on an underside. The disclosed pans appear to solve the problem of providing a unified utensil for the cooking and holding of small portions of foodstuffs, but are of specialized construction, and require owners of existing cookware to acquire complete new pans for combining a cooking and warming function.

OBJECTS OF THE INVENTION

An object of the present invention is to provide a device assisting in food preparation.

A further object of the present invention is to provide such a device with a surface for holding cooked food at a warm temperature.

A more particular object of the present invention is to provide such a device having such a surface requiring no external power source beyond that which is used for heating existing cooking surfaces.

Still another object of the present invention is to provide such a device that is simple of manufacture.

Still a further object of the present invention is to provide such a device that is convenient of use.

And yet a further object of the present invention is to provide such a device which allows improved use of existing cooking utensils.

These and other objects of the present invention will be apparent from the drawings and descriptions herein.

SUMMARY OF THE INVENTION

The present invention comprises a device or article of manufacture providing an auxiliary food preparation surface. In particular, the present invention provides an auxiliary preparation surface for use with existing cooking appliances or utensils, for maintaining cooked or partially cooked foodstuffs in a warmed state prior to serving or further processing or preparation steps. This aim is achieved by providing a substantially flat body or article with appropriate surface and bulk properties, for overlay on an pre-existing cooking surface of a pan, griddle or grill.

Pursuant to one embodiment of the present invention, the body member of a food warmer includes: (i) a first or lower surface, suitable for contact with a pre-existing cooking surface of an appliance or utensil; (ii) a second or upper surface, suitable for contact with cooked foodstuffs; and (iii) a bulk thermal conductance suitable for maintaining the upper surface at a correct temperature differential with respect to the lower surface under intended conditions of use.

Preferably, the body member of the food warmer is provided with a device for maintaining the body member in a substantially fixed position with respect to a pre-existing cooking surface, i.e., the body member of the warmer is generally attached to an existing food preparation appliance or utensil so as to be restricted from moving around during use. Optionally, the device for maintaining the body member of the warmer in a substantially fixed position may elevate the body member above an existing cooking or food preparation surface so as to form a shelf In this option, the shelf may further be optionally provided with one or more legs for support and stability. In a further variation, the body member of the food warmer may take the form of a shelf which is suspended or cantilevered from a sidewall of a pan or other existing cooking utensil. The shelf may extend inwardly over the cooking surface of the pan or cooking utensil. Alternatively, the shelf may extend outwardly from the sidewall of the pan or cooking utensil. In this case, the shelf is warmed partially by conduction from the sidewall of the pan or utensil and partially by hot air and gas rising up along the pan or utensil sidewall from a burner or other heating source.

The body member of a food warmer in accordance with the present invention, particularly where the body member has a flat upper surface, may be provided with a lip or berm an edge of the upper surface to aid in confining cooked or partially cooked foodstuff to the upper surface.

The present invention optionally incorporates a handle for facilitating a lifting the body member of the warmer from a heated cooking surface and facilitating a transfer of cooked or partially cooked foodstuffs from the heated cooking surface to another location for further processing or preparation steps. A food warmer in accordance with the present invention additional optionally incorporates one or more hooks, clamps or brackets for attachment to a side-wall or lip of an existing cooking utensil or appliance. Many types of clips, thumbscrews, hanging brackets and other attachment mechanisms will readily suggest themselves to those skilled in the mechanical arts.

BRIEF DESCRIPTION OF THE DRAWINGS

FIG. 3 is a schematic cross-sectional view of a engagement of coupling bracket for supporting an edge of the insert of FIG. 2 on a sidewall of the frying pan of FIG. 2.

FIG. 4 is a schematic cross-sectional view of an alternative engagement bracket or coupling device for supporting an edge of the insert of FIG. 2 on the sidewall of the frying pan.

FIG. 5 is a schematic cross-sectional view of a variation of the food warming insert of FIG. 1, showing an alternative handle, and a clip for removable attachment of the insert to a frying pan.

FIG. 6 is a schematic cross-sectional view showing a detail, on a larger scale, of the frying pan insert of FIG. 2.

FIG. 7 is a schematic perspective of a barbeque grill showing a further embodiment of a food warming insert in accordance with the present invention.

FIG. 8 is a schematic perspective view of the insert of FIG. 7, showing an underside thereof.

FIG. 9 is a further schematic perspective view of the insert of FIG. 7, showing a detail of devices for attachment of the insert to the barbeque grill of FIG. 7.

DETAILED DESCRIPTION OF THE INVENTION

Figure 1:
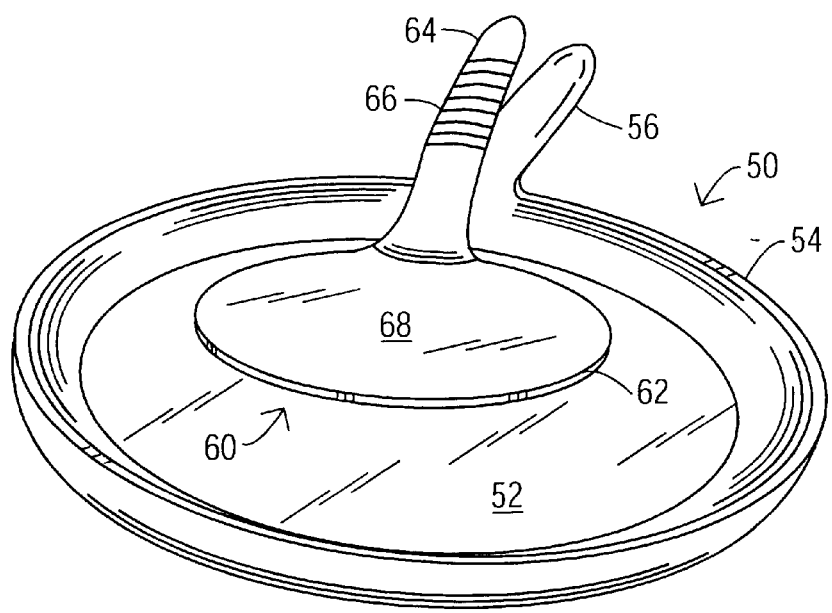
FIG. 1 is a schematic perspective view of a frying pan, showing a food warmer insert in accordance with the present invention.

As shown in FIG. 1, a frying pan 50 has a sidewall 54, a cooking surface 52 and a handle 56. A removable food warmer assembly or insert 60 includes an essentially flat body member or platen 62 having an upper food-warming surface 68 and further includes a handle 64 provided with a grip 66. In use, platen 62 rests on cooking surface 52, with warming surface 68 facing upward. Handle 64 permits comfortable removal of assembly 60 from frying pan 50 even when the assembly has an elevated temperature.

Figure 2:
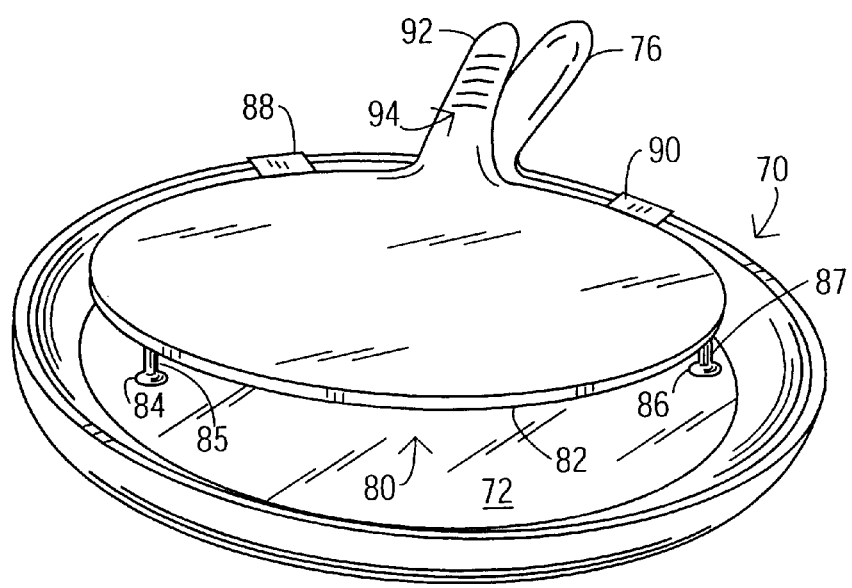
FIG. 2 is a schematic perspective view of a frying pan, showing another food warming insert in accordance with the present invention.

An alternative frying pan insert 80 for warming cooked food items is shown in FIG. 2. A frying pan 70 has a sidewall 74, a cooking surface 72 and a handle 76. Insert 80 has a flat body member or platen 82 which is partially suspended from sidewall 74 via brackets 88 and 90 and partially supported by legs 85 and 87 to form a shelf disposed above cooking surface 72. Brackets 88, 90 disengageably rest on sidewall 74, as shown in greater detail in FIG. 3. Alternatively brackets 88, 90 are provided with thumbscrews 92 (FIG. 4) for securely mounting insert 80 to sidewall 74. Leg 85 is shown in greater detail in FIG. 6. A post 116 is attached by weld 114 to a lower surface (not separately designated) of platen 82. At an opposite end of post 116, a foot 84 in the form of a polytetraflouroethylene ball is affixed, providing protection to pan bottom or cooking surface 72. Platen 82 is also provided with a handle 92 equipped with grips 94 (FIG. 2).

Another embodiment of the present invention is illustrated in FIG. 5. A handle 100 is formed integrally with a planar body member or platen 104 via an elbow 102. Platen 104 is at least partially coated with a layer 106 of polytetraflouroethylene for providing non-stick contact with a cooking surface or a frying pan or other cooking utensil on a bottom side and for providing non-stick contact with a supported food item on an upper side 118. Handle 100 is provided with a grip 108 and a clip 110, attached to handle 110 at a bracket 112. Clip 110 is spring-loaded (not illustrated) at bracket 112, for clipping to a sidewall (not illustrated) of a pot or pan.

An alternative embodiment for use in barbequing is depicted in FIG. 7. A ceramic platen 120 has an upper or food contact surface 128 and is provided with hooks or brackets 124, 126 for attachment to a lip or rim of a sidewall 116 of a barbeque grill 122 having a wire mesh grill element 118. A lower surface 130 of platen 120 is illustrated in greater detail in FIG. 8. Lower surface 130 is equipped with ridges or scallop profiles 132 for minimizing sliding on grill element 118. Scallop profiles 132 may either be convex as shown in FIG. 8, or concave (not illustrated). A further detail of hooks or brackets 124, 126 (FIG. 7) is shown in FIG. 9. Brackets 124, 126 comprise principal members 134, 136 terminating in hook shapes (not separately 20 designated). Attached to members 134, 136 are a second pair of auxiliary hook shapes or brackets 138, 140 providing an alternative attachment point to sidewall 116 of barbeque grill 122. Attachment via hook shapes of principal members 134, 136 allows lower surface 130 of ceramic platen 120 to rest directly on grill element 118, as shown in FIG. 7. Attachment of platen 120 to sidewall 116 via auxiliary brackets 138, 140 results in an elevation of the platen above the effective cooking surface formed by grill element 118. The air gap or spacing thus provided serves to set a lower warming or holding temperature at food contact surface 128.

Platen 120, as well as the body members or platens of other food warmers as described herein, may be augmented in insulative value by a "sandwich" construction, consisting of alternating layers of metal and ceramic (not illustrated), as is well known in the insulating art.

It will be understood that the various embodiments of the present invention illustrated herein are provided for illustration. Other, equivalent, embodiments can be readily conceived. For example metal legs may be provided to ceramic platen 120 to hold the platen in relief from grill element 118, analogous to the embodiment of FIG. 2. Therefore, the specific embodiments illustrated are in no way are intended to limit the scope of the present invention.

What is claimed is:

1. A cooking accessory for warming food items which have been cooked on a flat cooking surface of a cooking utensil having a substantially vertical sidewall with a lip or rim, comprising:

a body member having an upper surface for supporting cooked food items, said body member also having a lower surface; and an engagement or coupling device attached to said body member and releasably engageable with the lip or rim or of the cooking utensil sidewall for holding said body member in position over a portion of the cooking surface of the cooking utensil, said engagement or coupling device being adapted to position said lower surface in contact with the cooking surface of the cooking utensil.

2. The accessory of claim 1 wherein said body member is substantially flat, said engagement or coupling device being releasable engageable with the lip or rim or of the cooking utensil sidewall for maintaining said lower surface and said cooking surface substantially parallel to one another.

3. The accessory of claim 1 wherein said body member is provided with a handle for facilitating manipulation thereof particularly when said body member is hot.

4. The accessory of claim 1 wherein said engagement or coupling device includes a at least one element taken from the group consisting of a hook and a clamp.

5. A cooking accessory for warming food items which have been cooked on a flat cooking surface of a cooking utensil having a substantially vertical sidewall with a lip or rim, comprising:

a substantially flat body member having a lower surface, said body member having an upper surface for supporting cooked food items;

an engagement or coupling device attached to said body member and engageable with the lip or rim or of a cooking utensil sidewall for holding said lower surface and said cooking surface in substantially parallel relation to one another; and at least one leg attached to said body member for supporting said body member at a distance above said cooking surface.

6. The accessory of claim 5 wherein said engagement or coupling device is adapted to position said body member over an inside or cooking area of a cooking utensil having a flat cooking surface.

7. The accessory of claim 5, further comprising a handle for facilitating manipulation of said body member particularly when said body member has an elevated temperature.

8. The accessory of claim 5 wherein said engagement or coupling device includes at least one element taken from the group consisting of a hook and a clamp.

9. A cooking accessory for warming food items which have been cooked on a flat cooking surface of a cooking utensil, comprising:

a substantially flat body member having a lower surface, said body member having an upper surface for supporting cooked food items, said body member having, on a lower side opposite said upper surface, engagement surfaces for resting said flat body member on the cooking surface of the cooking utensil; and a handle attached to said flat body member for facilitating deposition of said flat body member on said cooking surface and removal of said body member from said cooking surface.

10. A method of cooking, comprising:

providing a cooking device having a cooking surface;

operating a heat source to provide heat energy to said cooking surface;

providing an at least partially insulated warming member;

removably supporting said warming member on said cooking surface so that said warming member absorbs heat from said cooking surface;

cooking a foodstuff on said cooking surface, while said warming member is disposed on said cooking surface;

moving the cooked foodstuff from said cooking surface to said warming member; and subsequently removing said warming member from said cooking device.

11. The method defined in claim 10, further comprising:

subsequent to the moving of the cooked foodstuff from said cooking surface to said warming member, cooking a food item on said cooking surface;

during the cooking of said food item, maintaining the cooked foodstuff on said warming member; and subsequent to beginning the cooking of said food item, removing said foodstuff from said warming member.

* * * * *